United States Patent
Buerkle et al.

[11] Patent Number: 6,157,740
[45] Date of Patent: *Dec. 5, 2000

[54] COMPRESSION/DECOMPRESSION ENGINE FOR ENHANCED MEMORY STORAGE IN MPEG DECODER

[75] Inventors: Daniel J. Buerkle, Newark Valley; Chuck H. Ngai, Endwell, both of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/971,438

[22] Filed: Nov. 17, 1997

[51] Int. Cl.[7] .................................................. G06K 9/36
[52] U.S. Cl. .................. 382/233; 382/166; 382/248; 382/281; 348/403; 708/400
[58] Field of Search .................................... 382/248, 281, 382/166, 232–235, 239, 250, 162; 708/400–405, 410, 203; 348/403–408, 395–398, 420; 709/247; 386/109, 112; 358/262.1; 345/439

[56] References Cited

U.S. PATENT DOCUMENTS

| | | | |
|---|---|---|---|
| 3,859,515 | 1/1975 | Radcliffe, Jr. | 708/410 |
| 4,210,931 | 7/1980 | Bailey et al. | 386/112 |
| 4,302,775 | 11/1981 | Widergren et al. | 348/406 |
| 4,394,774 | 7/1983 | Widergren et al. | 382/250 |
| 4,621,337 | 11/1986 | Cates et al. | 708/410 |
| 4,829,378 | 5/1989 | LeGall | 348/398 |
| 5,247,589 | 9/1993 | Faul et al. | 382/166 |
| 5,301,242 | 4/1994 | Gonzales et al. | 382/239 |
| 5,339,265 | 8/1994 | Liu et al. | 708/400 |
| 5,636,152 | 6/1997 | Yang et al. | 708/401 |
| 5,644,504 | 7/1997 | Boice et al. | 382/248 |
| 5,708,732 | 1/1998 | Merhav et al. | 382/232 |
| 5,805,293 | 10/1998 | Mochizuki | 358/262.1 |
| 5,812,144 | 9/1998 | Potu et al. | 345/439 |
| 5,812,789 | 9/1998 | Diaz et al. | 709/247 |
| 5,818,970 | 10/1998 | Ishikawa et al. | 382/248 |
| 5,963,260 | 10/1999 | Bakhmutsky | 348/420 |
| 5,986,711 | 11/1999 | Pau | 348/408 |

Primary Examiner—Leo H. Boudreau
Assistant Examiner—Ishrat Sherali
Attorney, Agent, or Firm—Heslin & Rothenberg, P.C.; William H. Steinberg, Esq.

[57] ABSTRACT

A compression/decompression engine is disclosed for reducing memory requirements of a decode system by storing decoded video data in compressed form. The compression engine comprises parsing chrominance UV data into separate chrominance U data and chrominance V data, and transform logic implementing a Hadamard transformation of multiple bytes of decoded video data in parallel into frequency domain signals. Compression logic is coupled to the transform logic and performs, preferably, a 2:1 transformation of the frequency domain signals to produce compressed video signals for storage in memory. The transform logic and compression logic transform and compress multiple bytes of decoded video data in parallel within a single clock cycle of the decode system. Upon retrieval from memory, the compressed data is returned to original format by the decompression engine, which employs the same transform logic as used by the compression engine. Reassembly logic then returns the separate chrominance U data and chrominance V data to chrominance UV data for use by the associated motion compensation unit or for display.

26 Claims, 8 Drawing Sheets

COMPRESSION/DECOMPRESSION ENGINE FOR ENHANCED MEMORY STORAGE IN MPEG DECODER

TECHNICAL FIELD

The present invention relates to the field of data compression and, more particularly, to a compression/decompression engine and technique for compressing/decompressing decoded video data within an MPEG decoder for conserving frame buffer memory.

BACKGROUND OF THE INVENTION

Technological advances in digital transmission networks, digital storage media, very large scale integration devices, and digital processing of video and audio signals are converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiberoptic networks, as well as broadcast terrestrially and other direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms have been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals.

The MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. The MPEG-2 standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 standard results in a balance between intraframe encoding and interframe encoding.

The MPEG-2 standard exploits temporal redundancy for motion compensated interpolative and predictive encoding. That is, the assumption is made that "locally" the current picture can be modeled as a translation of the picture at a previous and/or future time. "Locally" implies that the amplitude and direction of the displacement are not the same everywhere in the picture.

The MPEG-2 standard further specifies predictive and interpolative interframe encoding and frequency domain intraframe encoding. It has block-based motion compensation for the reduction of temporal redundancy and discrete cosine transform based compression for the reduction of spatial redundancy. Under MPEG-2, motion compensation is achieved by predictive coding, interpolative coding, and variable length coded motion vectors. The information relative to motion is based on a 16×16 array of pixels and is transmitted with the spatial information. It is compressed with variable length codes, such as Huffman codes.

Video decoding in accordance with the MPEG-2 standard is described in greater detail in commonly assigned U.S. Pat. No. 5,576,765, entitled "Video Decoder" which is hereby incorporated herein by reference in its entirety.

Video decoders are typically embodied as general or special purpose processors and memory. For a conventional MPEG-2 decoder, two decoded reference frames are typically stored in memory at the same time. Thus, the cost of memory can often dominate the cost of the decode system. For example, an MPEG-2 video decoder might employ 2 MB or more of external memory, which generally comprises dynamic random access memory (DRAM).

In order to establish commercial advantage, there remains an ongoing need to reduce further costs in the field of video data compression, and more particularly, to reduce cost of video decoders employed in decompressing digital motion video signals. The present invention is directed to this need.

DISCLOSURE OF THE INVENTION

Briefly summarized, this invention comprises in one aspect a compression unit for use in a system for decoding a digital video sequence. The system has a video decoder, memory and a memory controller. The compression unit is to be coupled between the video decoder and the memory controller for compressing decoded video data from the video decoder for storage in the memory by the memory controller. The compression unit includes transform logic for transforming the decoded video data from the video decoder to a frequency domain signal, and compression logic coupled to the transform logic for compressing the frequency domain signal to produce a compressed video signal. The compressed video signal is produced by the transform logic and the compression logic for multiple bytes of the decoded video data within a single clock cycle of the system. Preferably, the transform logic comprises a multi-point Hadamard transform implemented by multiple adders coupled in parallel.

In another aspect, the invention comprises a compression unit for a system for decoding a digital video sequence. The system has a video decoder, memory and a memory controller. The compression unit is coupled between the video decoder and the memory controller for compressing decoded video data from the video decoder for storage in the memory by the memory controller. The digital video sequence comprises chrominance UV data and luminance data. The compression unit includes means for separating chrominance U data and chrominance V data of the chrominance UV data into separate data strings and transform logic for transforming the separate data strings of the chrominance U data and the chrominance V data into frequency domain signals. The unit also includes compression logic coupled to the transform logic for compressing the frequency domain signals to produce compressed video signals representative of the separate data strings of chrominance U data and chrominance V data.

In a further aspect, the invention comprises a system for decoding a digital video sequence. The system includes a video decoder for decoding the digital video sequence and producing decoded video data, and memory and a memory controller coupled to the video decoder. Further, a compression engine is coupled between the video decoder and the memory controller for compressing decoded video data from the video decoder for storage in the memory by the memory controller. The compression engine includes transform logic for transforming the decoded video data from the video decoder to a frequency domain signal, and compression logic coupled to the transform logic for compressing the frequency domain signal to produce a compressed video signal. The transform logic and the compression logic together process multiple bytes of decoded video data in parallel within a single clock cycle of the system to produce the compressed video signal for storage in memory by the memory controller.

In still another aspect, the invention comprises a system for decoding a digital video sequence comprising chrominance UV data and luminance data. This system includes a video decoder for decoding the digital video sequence and producing decoded video data, as well as memory and a memory controller coupled to the video decoder. Further, this system includes a compression engine coupled between the video decoder and the memory controller for compressing decoded video data from the video decoder for storage in memory by the memory controller. The compression engine includes: means for parsing the chrominance UV data into separate chrominance U data and chrominance V data; transform logic for transforming the separate chrominance U data and chrominance V data into frequency domain signals; and compression logic coupled to the transform logic for compressing the frequency domain signals to produce compressed video signals representative of the separate chrominance U data and chrominance V data.

To restate, the present invention comprises a practical technique for reducing memory requirements of a conventional MPEG decode system by storing decoded video data sequences in compressed form. Pursuant to an implementation of this invention, hardware is provided for 2:1 compressing a decoded reference frame prior to storage in a frame buffer. Thus, with this technique, 1-MB DRAM can be employed in place of the 2-MB DRAM memory common in many decode systems. By so reducing memory requirements, significant cost savings are achieved. When a compressed frame is required for motion compensation or display, decompression of the data is performed, returning the data to its original decoded format using the same hardware as employed to compress the data.

Further, the compression/decompression engine described herein provides an efficient hardware design implementing N-point Hadamard matrix and subsequent lossy compression/decompression operations. Special parsing of video chrominance (UV) data is performed prior to compression, as well as reassembly of the compressed data to its original format after decompression. Data address and length translations are defined for hardware accesses to occur for storage/retrieval of Hadamard-compressed frame buffer data. Further, provisions for handling general data accesses to memory for which Hadamard de/compression is not performed, as well as the integration of non-Hadamard and Hadamard accesses, dynamically switched, into a single system are disclosed.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

As the present invention may be applied in connection with an MPEG-2 decoder, in order to facilitate an understanding of the invention, some pertinent aspects of the MPEG-2 compression algorithm are first reviewed. It is to be noted, however, that the invention can also be applied to other video coding algorithms which share some of the features of the MPEG-2 algorithm.

To begin with, it will be understood that the compression of a data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 algorithm for Step 1 can be described as predictive/interpolative motion-compensated hybrid DCT/DPCM coding. Huffman coding, also known as variable length coding, is used in Step 2.

The MPEG-2 video standard specifies a coded representation of video for transmission as set forth in ISO-IEC JTC1/SC29/WG11, Generic Coding of Moving Pictures and Associated Audio Information: Video, International Standard, 1994. The algorithm is designed to operate on interlaced or noninterlaced component video. Each picture has three components: luminance (Y), red color difference (Cr), and blue color difference (Cb). The video data may be coded in 4:4:4 format, in which case there is one Cr and one Cb sample for each Y sample, in 4:2:2 format, in which case there are half as many Cr and Cb samples as luminance samples in the horizontal direction, or in 4:2:0 format, in which case there are half as many Cr and Cb samples as luminance samples in both the horizontal and vertical directions.

Figure 1:
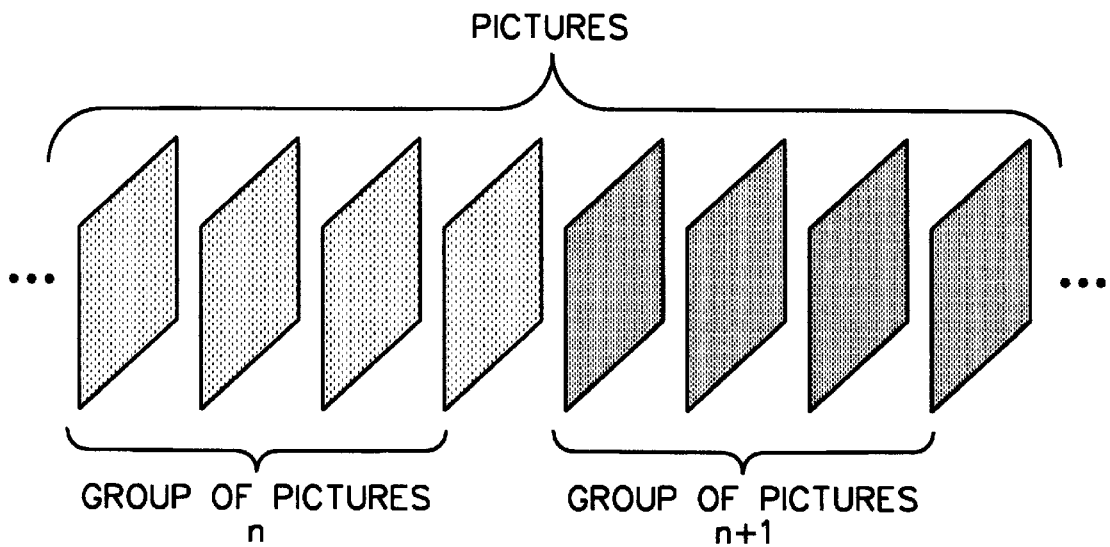
FIG. 1 shows an exemplary pair of groups of pictures (GOPs)
Figure 2:
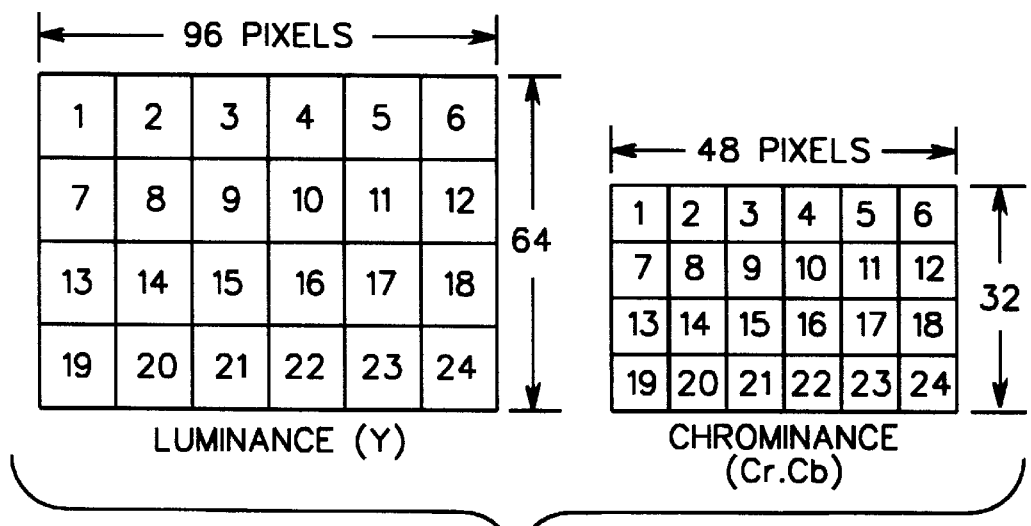
FIG. 2 shows an exemplary macroblock (MB) subdivision of a picture (for 4:2:0 format)

An MPEG-2 data stream consists of a video stream and an audio stream which are packed, together with systems information and possibly other bitstreams, into a systems data stream that can be regarded as layered. Within the video layer of the MPEG-2 data stream, the compressed data is further layered. A description of the organization of the layers will aid in understanding the invention. These layers of the MPEG-2 Video Layered Structure are shown in FIGS. 1 & 2. The layers pertain to the operation of the compression algorithm as well as the composition of a compressed bit stream. The highest layer is the Video Sequence Layer, containing control information and parameters for the entire sequence. At the next layer, a sequence is subdivided into sets of consecutive pictures, each known as a "Group of Pictures" (GOP). A general illustration of this layer is shown in FIG. 1. Decoding may begin at the start of any GOP, essentially independent of the preceding GOPs. There is no limit to the number of pictures which may be in a GOP, nor do there have to be equal numbers of pictures in all GOPs.

The third or Picture layer is a single picture. A general illustration of this layer is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as a "macroblock" (MB). Macroblocks in a picture are numbered consecutively in lexicographic order, starting with Macroblock 1.

Between the Picture and MB layers is the fourth or "slice" layer. Each slice consists of some number of consecutive MB's. Finally, each MB consists of four 8×8 luminance blocks and 8, 4, or 2 (for 4:4:4, 4:2:2 and 4:2:0 video) chrominance blocks. The Sequence, GOP, Picture, and slice layers all have headers associated with them. The headers begin with byte-aligned Start Codes and contain information pertinent to the data contained in the corresponding layer.

A picture can be either field-structured or frame-structured. A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a field-structured picture contains information for C×R/2 pixels.

The two fields in a frame are the top field and the bottom field. If we number the lines in a frame starting from 1, then the top field contains the odd lines (1, 3, 5, . . . ) and the bottom field contains the even lines (2, 4, 6, . . . ). Thus we may also call the top field the odd field, and the bottom field the even field.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

Within a GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called reference pictures.

With the MPEG-2 standard, a frame can be coded either as a frame-structured picture or as two field-structured pictures. If a frame is coded as two field-structured pictures, then both fields can be coded as I pictures, the first field can be coded as an I picture and the second field as a P picture, both fields can be coded as P pictures, or both fields can be coded as B pictures.

If a frame is coded as a frame-structured I picture, as two field-structured I pictures, or as a field-structured I picture followed by a field-structured P picture, we say that the frame is an I frame; it can be reconstructed without using picture data from previous frames. If a frame is coded as a frame-structured P picture or as two field-structured P pictures, we say that the frame is a P frame; it can be reconstructed from information in the current frame and the previously coded I or P frame. If a frame is coded as a frame-structured B picture or as two field-structured B pictures, we say that the frame is a B frame; it can be reconstructed from information in the current frame and the two previously coded I or P frames (i.e., the I or P frames that will appear before and after the B frame). We refer to I or P frames as reference frames.

A common compression technique is transform coding. In MPEG-2 and several other compression standards, the discrete cosine transform (DCT) is the transform of choice. The compression of an I-picture is achieved by the steps of 1) taking the DCT of blocks of pixels, 2) quantizing the DCT coefficients, and 3) Huffman coding the result. In MPEG-2, the DCT operation converts a block of n×n pixels into an n×n set of transform coefficients. Like several of the international compression standards, the MPEG-2 algorithm uses a DCT block size of 8×8. The DCT transformation by itself is a lossless operation, which can be inverted to within the precision of the computing device and the algorithm with which it is performed.

The second step, quantization of the DCT coefficients, is the primary source of lossiness in the MPEG-2 algorithm. Denoting the elements of the two-dimensional array of DCT coefficients by cmn, where m and n can range from 0 to 7, aside from truncation or rounding corrections, quantization is achieved by dividing each DCT coefficient cmn by wmn times QP, with wmn being a weighting factor and QP being the quantizer parameter. The weighting factor wmn allows coarser quantization to be applied to the less visually significant coefficients. The quantizer parameter QP is the primary means of trading off quality vs. bit-rate in MPEG-2. It is important to note that QP can vary from MB to MB within a picture.

Following quantization, the DCT coefficient information for each MB is organized and coded, using a set of Huffman codes. As the details of this step are not essential to an understanding of the invention and are generally understood in the art, no further description is needed here.

Most video sequences exhibit a high degree of correlation between consecutive pictures. A useful method to remove this redundancy prior to coding a picture is "motion compensation". MPEG-2 provides tools for several methods of motion compensation.

The methods of motion compensation have the following in common. For each macroblock, one or more motion vectors are encoded in the bit stream. These motion vectors allow the decoder to reconstruct a macroblock, called the predictive macroblock. The encoder subtracts the "predictive", macroblock from the macroblock to be encoded to form the "difference" macroblock. The encoder uses tools to compress the difference macroblock that are essentially similar to the tools used to compress an intra macroblock.

The type of a picture determines the methods of motion compensation that can be used. The encoder chooses from among these methods for each macroblock in the picture. If no motion compensation is used, the macroblock is intra (I). The encoder can make any macroblock intra. In a P or a B picture, forward (F) motion compensation can be used; in this case, the predictive macroblock is formed from data in the previous I or P frame. In a B picture, backward (B) motion compensation can also be used; in this case, the predictive macroblock is formed from data in the future I or P frame. In a B picture, forward/backward (FB) motion compensation can also be used; in this case, the predictive macroblock is formed from data in the previous I or P frame and the future I or P frame.

Because I and P pictures are used as references to reconstruct other pictures (B and P pictures) they are called reference pictures. Because two reference frames are needed to reconstruct B frames, MPEG-2 decoders typically store two decoded reference frames in memory.

Aside from the need to code side information relating to the MB mode used to code each MB and any motion vectors associated with that mode, the coding of motion-compensated macroblocks is very similar to that of intra-mode MBs. Although there is a small difference in the quantization, the model of division by wmn times QP still holds.

The MPEG-2 algorithm can be used with fixed bit-rate transmission media. However, the number of bits in each picture will not be exactly constant, due to the different types of picture processing, as well as the inherent variation with time of the spatio-temporal complexity of the scene being coded. The MPEG-2 algorithm uses a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

Figure 3:
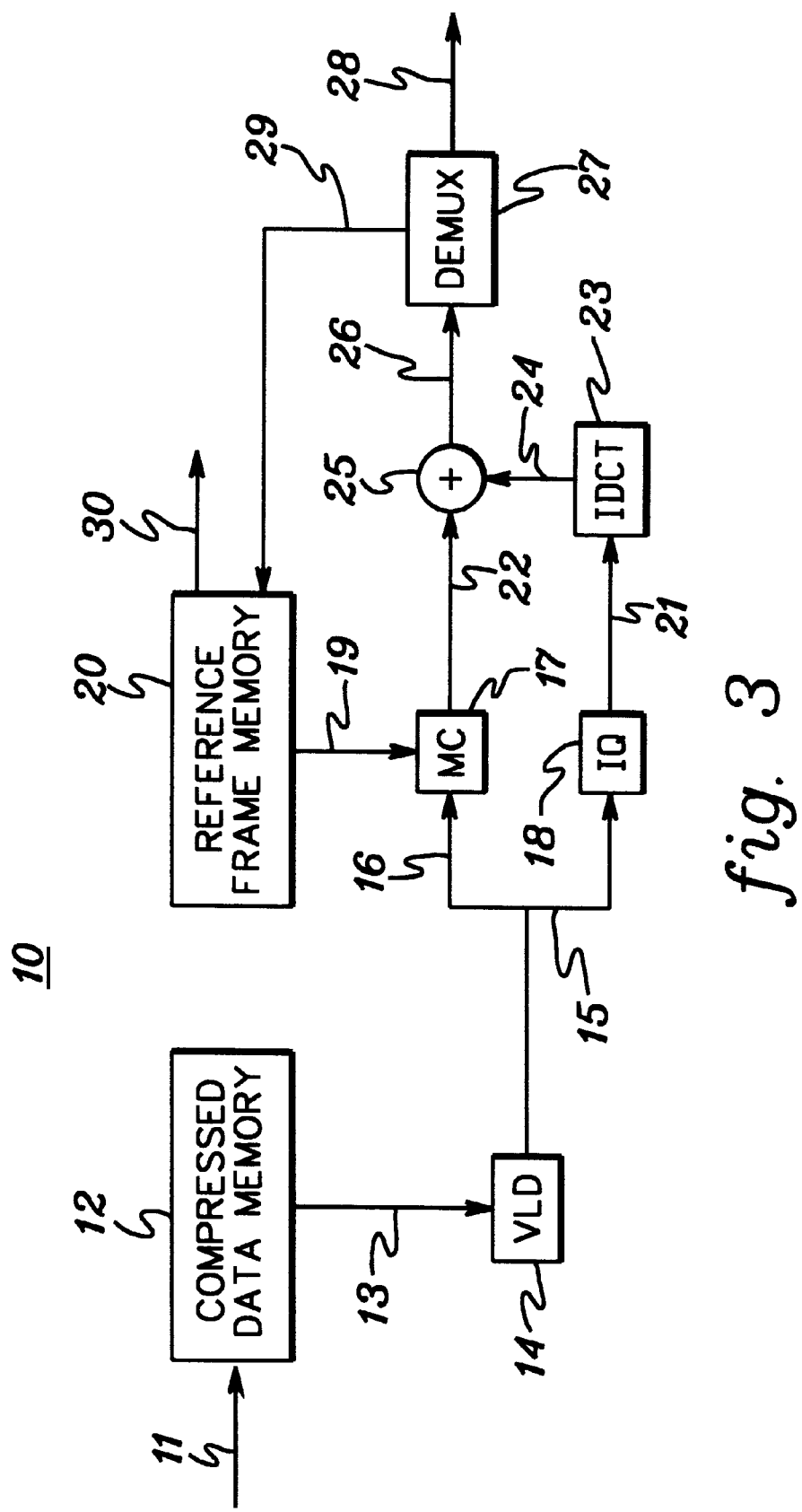
FIG. 3 depicts a block diagram of a video decoder.

FIG. 3 shows a diagram of a conventional video decoder. The compressed data enters as signal 11 and is stored in the compressed data memory 12. The variable length decoder (VLD) 14 reads the compressed data as signal 13 and sends motion compensation information as signal 16 to the motion compensation (MC) unit 17 and quantized coefficients as signal 15 to the inverse quantization (IQ) unit 18. The motion compensation unit reads the reference data from the reference frame memory 20 as signal 19 to form the predicted macroblock, which is sent as the signal 22 to the adder 25. The inverse quantization unit computes the unquantized coefficients, which are sent as signal 21 to the inverse transform (IDCT) unit 23. The inverse transform unit computes the reconstructed difference macroblock as the inverse transform of the unquantized coefficients. The reconstructed difference macroblock is sent as signal 24 to the adder 25, where it is added to the predicted macroblock. The adder 25 computes the reconstructed macroblock as the sum of the reconstructed difference macroblock and the predicted macroblock. The reconstructed macroblock is then sent as signal 26 to the demultiplexer 27, which stores the reconstructed macroblock as signal 29 to the reference memory if the macroblock comes from a reference picture or sends it out (to memory or display) as signal 28. Reference frames are sent out as signal 30 from the reference frame memory.

A decoding system in accordance with the principles of the present invention, which may employ a video decoder such as depicted in FIG. 3, is more particularly addressed in the remaining portion of this detailed description of the invention.

This decoding system implements a method for reducing the memory requirements of a conventional decoding system such as broadly described in commonly assigned U.S. patent application Ser. No. 08/599,695 filed by Linzer et al. on Feb. 9, 1996, entitled "Approximate MPEG Decoder With Compressed Reference Frames," the entirety of which is hereby incorporated herein by reference. In this commonly owned patent application, a reference picture in a sequence is decoded in the video decoder, then compressed before storage in external memory, i.e., the frame buffers. When a reference frame is needed for motion compensation, the frame is retrieved from external memory and then decompressed prior to transfer to the motion compensation unit. A decode system in accordance with the present invention comprises an enhanced implementation of this general method for reducing memory described in this commonly assigned, and incorporated patent application.

Figure 4:
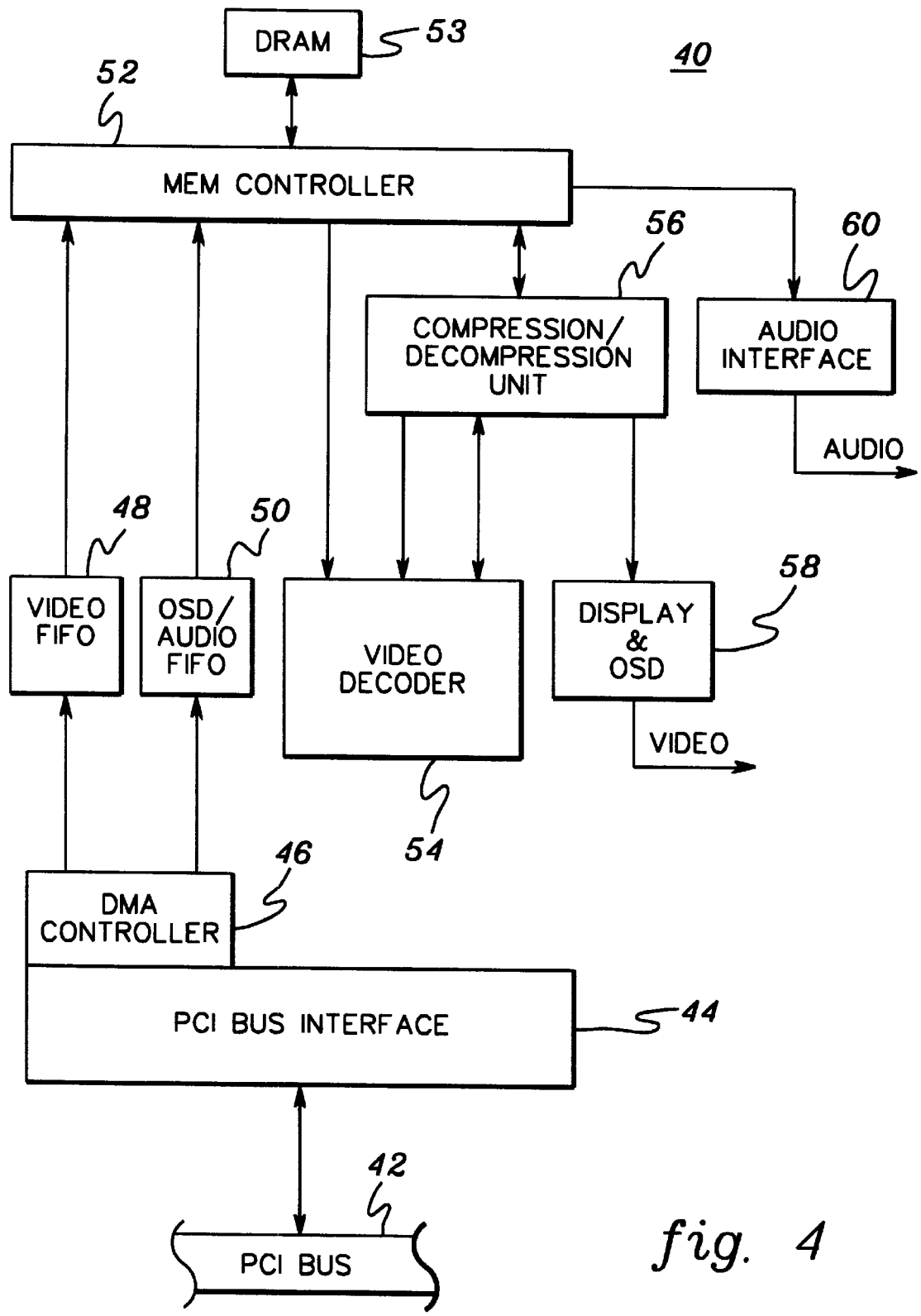
FIG. 4 is a block diagram of one embodiment of a video decoding system in accordance with the principles of the present invention.

A decode system, generally denoted 40, pursuant to the present invention is depicted in FIG. 4. System 40 includes a PCI bus interface 44 which couples the decode system 40 to a PCI bus 42. MPEG encoded video data is fetched from PCI bus 42 by a DMA controller 46 which writes the data to a video First-In/First-Out (FIFO) buffer 48. The DMA controller also fetches on-screen display and/or audio data from PCI bus 42 for writing to an OSD/audio FIFO 50. A memory controller 52 will place video data into a correct memory buffer within dynamic random access memory (DRAM) 53. MPEG compressed video data is then retrieved by the video decoder 54 from DRAM 53 and decoded as described above in connection with FIG. 3. Conventionally, the decoded video data is then stored back into the frame buffers of DRAM 53 for subsequent use as already described.

In accordance with the principles of this invention, decoded video data to be written to memory 53 by Mem Controller 52 is first compressed by a compression/decompression engine or unit 56. When a reference frame is needed, or when video data is to be output from the decode system, the compressed data in DRAM 53 is retrieved by the Mem Controller and forwarded to compression/decompression unit 56 where the decoded video data is returned to its original format. Output of video data is via a display & OSD interface 58, while audio data (retrieved by the memory controller 52) is output directly through an audio interface 60. This invention comprises a practical implementation for compression/decompression unit 56, including certain address and length translations needed to allow storage and retrieval of compressed video data. These translations, although considered herein to be part of the compression/decompression engine or unit, may be implemented in hardware/software external to the logic described hereinbelow implementing the compression/decompression function.

Figure 5:
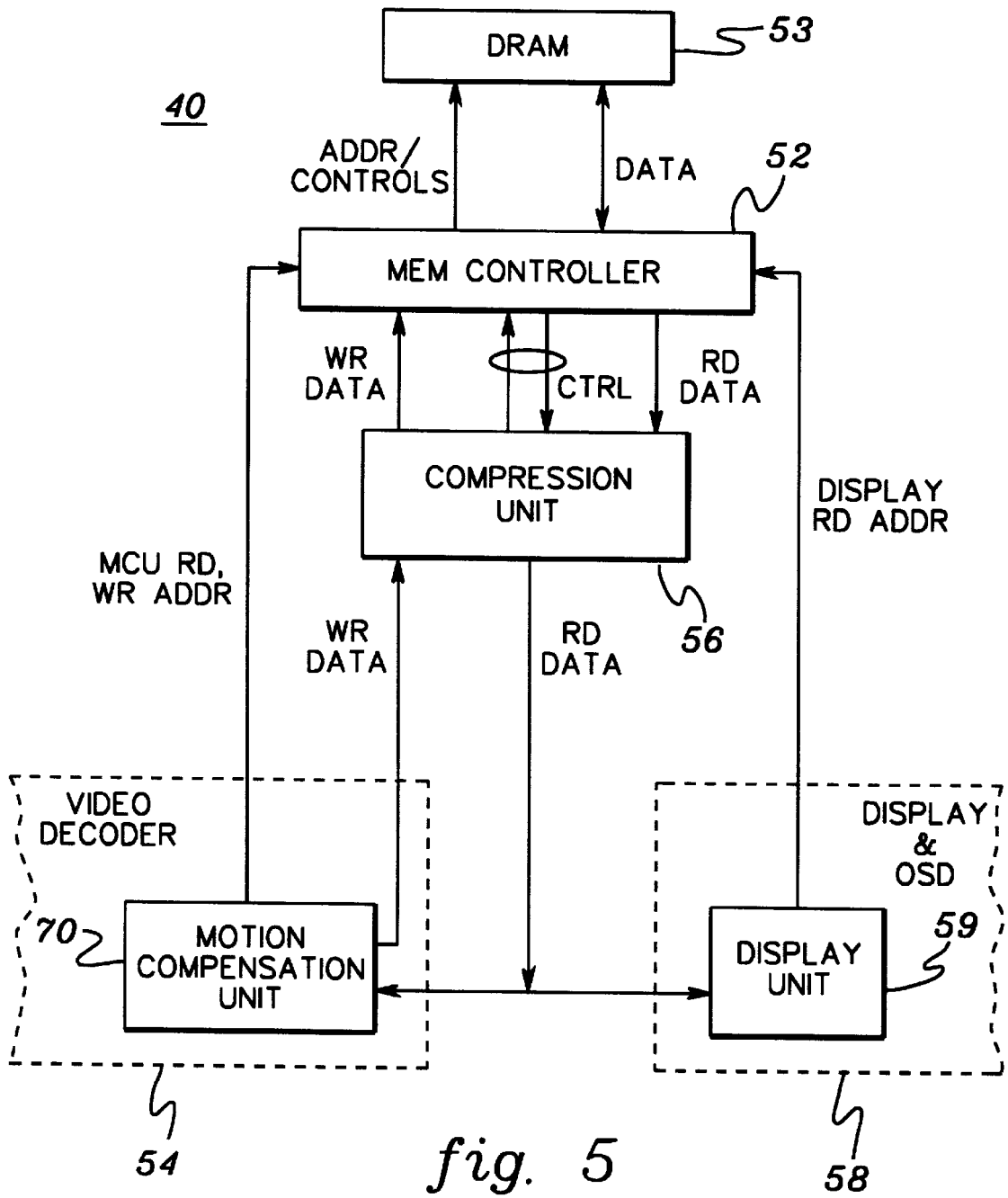
FIG. 5 is a partial block diagram of the video decoding system of FIG. 4 showing data and address line connections between selected system components in accordance with the present invention.

FIG. 5 depicts one embodiment of certain interconnections, pursuant to this invention, between video decoder 54, compression unit 56, memory controller 52, DRAM 53 and display & OSD logic 58. As shown, the memory controller accesses previously compressed data in DRAM 53 via appropriate address/control signals. Control signals are also communicated between Mem Controller 52 and compression unit 56, e.g., for coordinating the writing of data to DRAM 53 and the reading of data from DRAM 53. Compression/decompression unit 56 provides decompressed read (RD) data to the motion compensation unit 70 of video decoder 54 and to a display unit 59 coupled to display & OSD 58. As noted above, unit 56 compresses data to be written (WR) to DRAM 53 from video decoder 54, and in particular, from motion compensation unit (MCU) 70. Read and write addressing from the motion compensation unit is communicated directly to Mem Controller 52, as is display read addressing from display unit 59. MCU read and write requests and read and write acknowledges (not shown) are sent between video decoder 54 and Mem Controller 52, while display read requests and display read acknowledges are sent between display unit 59 and Memory Controller 52. Although also not shown, one skilled in the art will understand that various control and address signal lines couple MCU 70 to compression unit 56, as well as display unit 59 to compression unit 56.

The MPEG-decompressed video data buffers, also called Frame Buffers, consume the largest part of External DRAM, therefore they are the prime candidate for memory reduction/compression. The Frame Buffers contain final pixel display and MPEG-reference data, hence the reduction technique must retain high video fidelity. The Hadamard technique introduced as a possible algorithm in the above-referenced, commonly assigned, copending application entitled "Approximate MPEG Decoder With Compressed Reference Frames," is chosen herein since it fulfills the above requirement.

This disclosure describes a detailed embodiment of a hardware de/compression unit implementation, chrominance (referred to as "UV") data parsing, and address/length translation logic providing a practical implementation of the data compression concept. (Chrominance data, although usually of the Cr/Cb color space type, are interchangeably called UV throughout this disclosure.) More particularly, this invention discloses:

An efficient hardware (HW) design and implementation of an N-point Hadamard matrix and lossy compression/decompression arithmetic operation.

Special parsing of video chrominance (UV) data prior to compression thereof and restoration to its normal format after decompression, and associated buffering.

Special data address and length translations required for the various HW accesses that can occur for Hadamard-compressed Frame Buffer data.

Provisions for handling general data accesses to External DRAM for which Hadamard de/compression is not performed (i.e., for non-Frame-Buffer accesses or for Frame Buffer accesses for which, due to certain modes of operation, Hadamard de/compression is not done). Also, the integration of non-Hadamard & Hadamard accesses, dynamically switched, into a single decode system.

Performance (i.e., speed of boolean computation functions) is a primary design consideration for Hadamard Memory Reduction (HMR) in accordance with this invention due to certain assumed, aggressive timing constraints of:

47.250 MHz Clock Frequency (Period=21.164 ns); and

Non-leading-edge target semiconductor technology with good but relatively slow circuit/gate delays.

This desired implementation imposes the need for an efficient logic design with small circuit delays (i.e., few logic stages).

Figure 6:
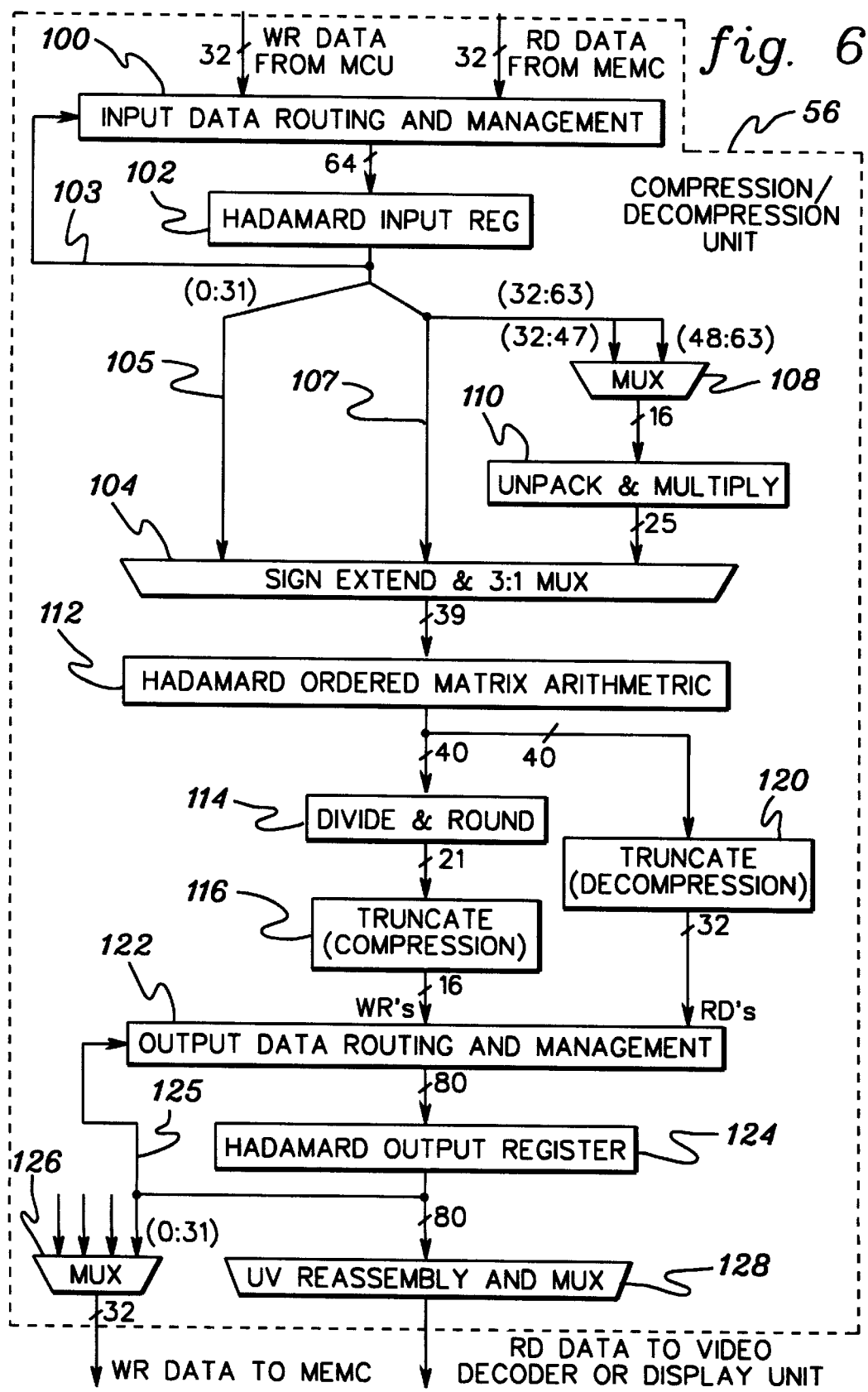
FIG. 6 is a block diagram of one embodiment of a compression/decompression engine in accordance with the principles of the present invention for the decode system of FIGS. 4 & 5.

One embodiment of a compression/decompression engine or unit 56 in accordance with the present invention is depicted in FIG. 6. In data compress mode, unit 56 intercepts for compression data to be written to DRAM 53 (reference FIG. 5) from video decoder 54, and compressed data read from DRAM 53 for decompression and forwarding to either motion compensation unit 70 or display unit 59 as described above. Compression/decompression unit 56 therefore has two data input lines. These lines connect to an input data routing and management logic block 100. Within logic 100, data to be written to memory undergoes special processing. In particular, chrominance (UV) data is parsed into U-only and V-only data. Luminance (Y) data is passed unchanged. Data read from external memory via the Mem Controller (comprising previously stored Hadamard-compressed data in accordance with the present invention) undergoes no special handling for either Y or U-only or V-only components at this time. 64 bits are passed from logic 100 to a Hadamard input register 102. Since as described below, only 4 bytes of this 8-byte quantity are operated on at a time, there is feedback 103 from Hadamard input register 102 to the management and routing block 100.

From input register 102, the 4 most significant bytes (0:31) are provided 105 to a 3:1 multiplexer 104, as are the 4 least significant bytes (32:63) 107. If the video data sequence comprises Hadamard-compressed data read from the DRAM, then special multiplexing 108, unpacking and multiplying 110 operations are performed as described hereinbelow.

Assume that the current data to be compressed comprises the most significant 4 bytes. This data is first extended to 39 bits through a sign extension of each byte, extending the three most significant bytes each to 10 bit quantities and the least significant byte to a 9 bit quantity. In accordance with this invention, four distinct bytes or samples are transferred from Hadamard input register 102 through MUX 104 to a Hadamard-ordered matrix arithmetic logic block 112 where Hadamard transform is performed in parallel on the data, i.e., again assuming that the data is intercepted pursuant to a WR access to external memory. After transforming the data, 40 bits are fed to lossy compression logic comprising divide and round logic 114 which reduces the number of bits to 21, and truncate (compression) logic 116, which further reduces the number of bits to 16. Thus, in accordance with this example, a 2:1 compression is implemented after Hadamard transformation of the data.

Should the current video data sequence comprise previously compressed data read from the external memory, then this data is unpacked and multiplied 110 before undergoing inverse Hadamard transformation within the same logic 112, and then being passed through a truncate (decompression) block 120. Both compressed data writes (WR's) and decompressed data reads (RD's) are channeled through an output data routing and management logic 122. Logic 122 outputs 8 bytes of data, 10 bits each to a Hadamard output register 124.

Output data routing and management 122 also receives a feedback 125 from register 124 since only 4 bytes of data are driven at a time. A multiplexer 126 selects which of the 4 bytes are to be driven out. Further, multiplexer 126 provides a dynamic capability to handle either Hadamard compressed data or non-Hadamard compressed data; that is, Hadamard compression in accordance with the principles of this invention can be selectively performed on different video data sequences.

For compressed data writes (WR's), within output data routing and management, luminance data accesses produce contiguous Y-result-Words, and UV data accesses produce alternating U-Words and V-Words since the chrominance data is initially parsed in order to perform Hadamard compression in accordance with this invention. Decompressed data reads (RD's), therefore undergo address-based shifting/alignment within routing and management 122. Chrominance reassembly occurs after Hadamard output register 124 in UV reassembly logic 128, which includes a multiplex operation.

Further details of this implementation of a compression/decompression engine in accordance with this invention are described below.

Hadamard Matrix and Lossy (De)Compression Logic Units
Hadamard Compression Operations for Frame Buffer WR Accesses The Hadamard $N^{th}$-order or N-point transform, a linear algebraic numerical technique, is mathematically related to the Walsh transform, among other frequency domain transforms. The N-point Hadamard transform is defined as the product of the N-point Hadamard matrix (an N×N array) and an N-element input vector. The 4-point Hadamard transform operation is:

$$y = (y_0 y_1 y_2 y_3) = (1/4) * \begin{vmatrix} 1 & 1 & 1 & 1 \\ 1 & 1 & -1 & -1 \\ 1 & -1 & -1 & 1 \\ 1 & -1 & 1 & -1 \end{vmatrix} * \begin{vmatrix} X_0 \\ X_1 \\ X_2 \\ X_3 \end{vmatrix}$$

where $x=(x_0\ x_1\ x_2\ x_3)$ is the input vector, y is the output vector, the ¼ term is generally 1/N, and the matrix is of the ordered (increasing "sequency") type. The above equation can be simplified to:

$y_0=¼·(x0+x1+x2+x3)$ $y_1=¼·(x0+x1-x2-x3)$ $y_2=¼·(x0-x1-x2+x3)$
$y_3=¼·(x0-x1+x2-x3)$ where if the ¼ term is treated separately, this arithmetic can be accomplished purely with binary adders performing additions and subtractions. This matrix arithmetic logic comprises matrix arithmetic block 112 in the compression/decompression unit 56 of FIG. 6. A detailed diagram of one preferred embodiment of this logic is depicted in FIG. 7.

As shown, Hadamard transform logic comprises 8 10-bit adders connected in two stages to perform the desired transformation in parallel for four bytes of data of a video data sequence. The input vector x0, x1, x2 & x3 is input to logic block 112 and output vector y0, y1, y2 & y3 is attained. Inputs x0, x1, x2 & x3 are each 8-bit unsigned values, and x0 & x1 extend to 10-bit unsigned values, while x2 & x3 extend to 10-bit and 9-bit unsigned values, respectively.

Following unpack, multiply and sign extend logic, input vector z'0, z'1, z'2 & z'3 comprises an input vector of Hadamard-compressed data to be decompressed when data reads from memory are performed. z'0 is an 8-bit unsigned value which extends to a 10-bit signed value. z'1 is a 7-bit signed value which is extended to 10-bit signed; while z'2 & z'3 are each 5-bit signed values, extended to 10-bit & 9-bit signed values.

Figure 7:
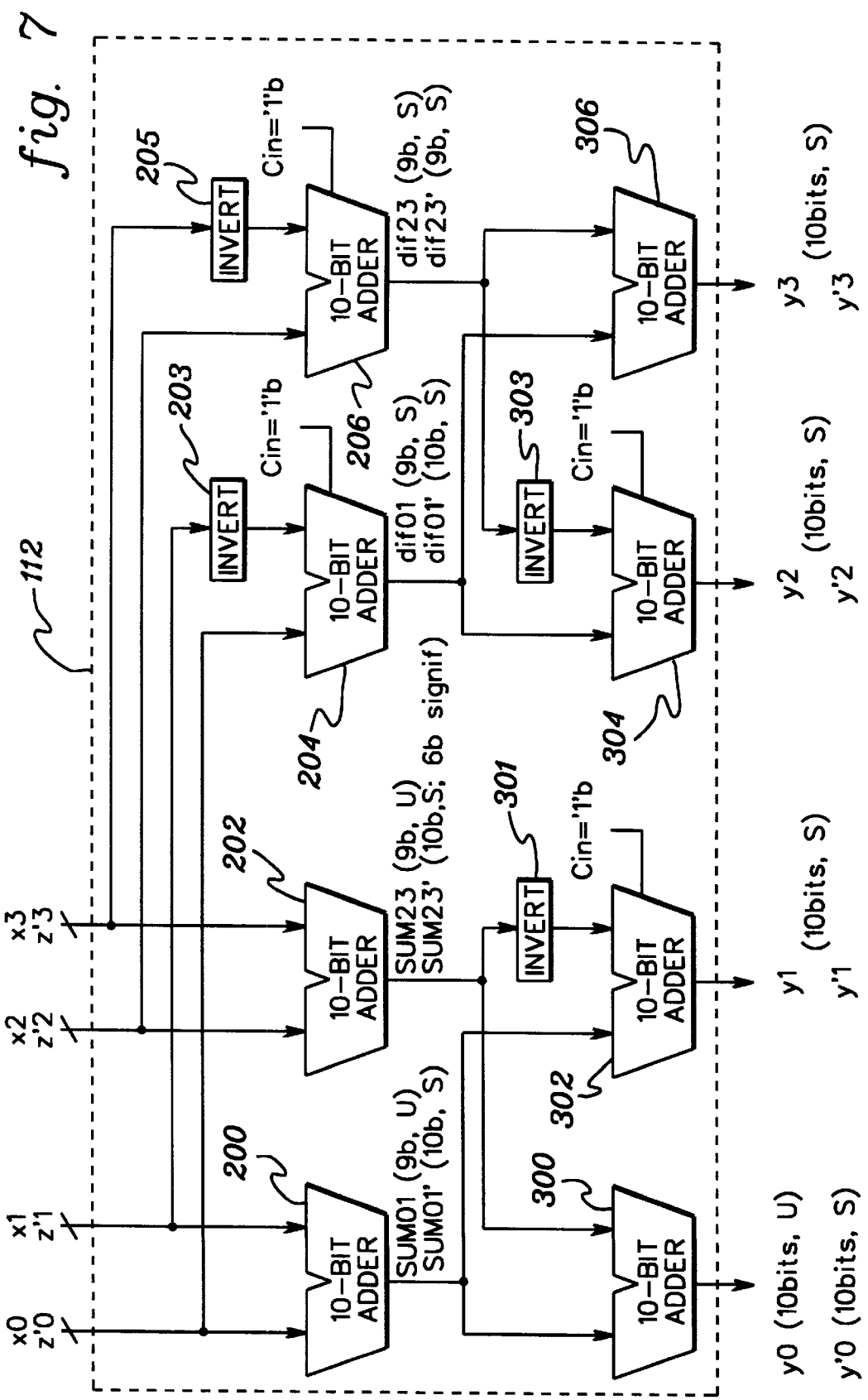
FIG. 7 is a schematic of one embodiment of the Hadamard ordered matrix arithmetic logic of the compression/decompression unit of FIG. 6 in accordance with the principles of the present invention.

With reference to FIG. 7 and the above equations defining y0, y1, y2 & y3, it can be seen that adder 200 adds x0+xl, and this sum is combined in adder 300 with the sum x2+x3 produced by adder 202 to arrive at y0, except for the ¼ multiplication which is handled subsequent to logic 112. y1 is defined as the sum x0+x1 from adder 200 and −(x2+x3) from adder 202. The negative of (x2+x3) is attained by inverting 301 the sum x2+x3 and then doing a carry-in so that y1=x0+x1−x2−x3 is output from adder 302. The invert plus carry-in equal '1' bit comprises a conventional technique for taking the 2's complement of a signal. This technique is used at adder 204 (i.e., invert 203 and Cin='1'b) to create x0−x1 and at adder 206 (i.e., invert 205 and Cin='1'b) to create x2−x3. The value x0−x1 is added in adder 304 with the 2's complement of x2−x3 (i.e., invert 303 and Cin='1'b) to produce y2=x0−x1−x2+x3. The remaining byte is created by adder 306 which adds x0−x3 and x2−x3 to produce the desired y3 output. Note that the resultant Hadamard transform is uncompressed in that 4 bytes are input and 4 bytes of data are output. The ¼ multiplication is accomplished in the subsequent lossy compression, described below.

As noted, the Hadamard transform is symmetric (i.e., the forward & inverse transforms use the same matrix) for real numbers. Hence, in accordance with this invention, the same adder circuitry is used to enact both the forward and inverse Hadamard transforms in hardware. DRAM modules generally have a single bidirectional data port, which imposes sequential access scheduling on the DRAM Controller. This, along with the Hadamard Transform symmetry, allow for the use of the same Hadamard Matrix arithmetic unit for both forward and inverse transforms in a time multiplexed fashion.

The 4-point Hadamard transform performed takes 4 bytes of data as input (i.e., the input vector's elements are each a 4-byte value), and each byte represents an unsigned integer. The output coefficient data vector has 4 elements, each of which is representable by 1 byte: the dc coefficient is an unsigned integer (0:255), while the 3 ac coefficients are signed 2's complement integers (−128:+127). Since it converts 4 bytes of input data to 4 bytes of output, this transform, by itself, obviously does not yield data compression. The specific, lossy compression technique described below is applied to the output vector y (=$y_0,y_1,y_2,y_3$) during write (WR) accesses to the Frame Buffers within DRAM 53 (FIG. 5) to realize the 2:1 compression ratio.

Divide $y_i$ by $2^{S_i}$, i=(0:3); where $s_{0:3}$=(1 2 3 3), as one example. The ¼ Hadamard Transform term and the $s_i$ divide are actually performed in one combined hardware operation, which is a simple arithmetic shift (i.e., the sign is retained).
Thus:

$ydiv_0 = y_0/8; \ ydiv_1 = y_1/16; \ ydiv_2 = y_2/32; \ ydiv_3 = y_3/32.$

The Divide and Round operations are implemented in logic 114 in the diagram of FIG. 6.

Round the divided coefficients to the nearest integer, with ties (i.e., divide results whose fractional part equal exactly ½) awarded to the nearest even integer; except that full scale values which would be rounded up to overflow ($10-s_i-2$) bits are truncated to the maximum value representable by that many bits. At this point, the resultant vector, which we call $z=(z_0 z_1 z_2 z_3)$, has the following range of values:

$z_0$: $(0:127)_{10}$; unsigned.
$z_1$: (−32:+31); signed.
$z_2$: (−16:+15); signed.
$z_3$: (−16:+15); signed.

In hardware (HW), for each separate element, the Round up operation is done via a parallel incrementer, while the Round down is a simple zeroing of the Divide result non-fractional part's least significant bit (lsb). The incrementer carry-in is a combination of the lsb and all fractional part bits.

Truncate some of these rounded coefficients to within a range that is representable by fewer bits still. The bit width vector, b, which specifies the post-truncation size for each coefficient, is set, for example, to (7 5 2 2). This yields the final result of the forward Hadamard compression, vector Z, to be of the following ranges:

$Z_0$: $(0:127)_{10}$; 7 bits, unsigned.
$Z_1$: (−16:+15); 5 bits, signed.
$Z_2$: (−2:+1); 2 bits, signed.
$Z_3$: (−2:+1); 2 bits, signed.

The Truncate logic 116 is shown in the compression/decompression unit 56 embodiment of FIG. 6.

After "packing" the elements $Z_{0:3}$, the result Z is a 2 byte quantity, which is then stored to DRAM (i.e., memory 53 of FIGS. 4 & 5). Thus, it is evident this invention provides a compression ratio of 2:1.

Hadamard Decompression Operations for Frame Buffer RD Accesses

Vector $Z=(Z_0 Z_1 Z_2 Z_3)$ is the input to this hardware procedure, and it is of the same 2-Byte form as the above final result. Unpacking, Multiply, and sign-extending of the elements $Z_i$ to 8 bits each, produces intermediate result z'. This is accomplished within Mux 108 and unpack & multiply 110 of FIG. 6. The Multiply operation is done with the same $s_{0:3}=(1\ 2\ 3\ 3)$, thus $z'_i = Z_i \cdot 2^{s_i}.$ Then z' is of the form:

$z'_0$: (0:254) even only; 8 bits, unsigned.
$z'_2$: (−16:+8) multiples of 8; 8 bits (5 signif), signed.
$z'_3$: (−16:+8) multiples of 8; 8 bits (5 signif), signed.

The next step is the N-point inverse Hadamard matrix "multiplication" on z', again accomplished by logic 112 of FIGS. 6 & 7. The resulting vector y' is of the form:

$y'_0$: (−96:+330); 10 bits.
$y'_1$: (−80:+314); 10 bits.
$y'_2$: (−84:+342); 10 bits.
$y'_3$: (−84:+342); 10 bits.

The final decompression step is to truncate (120 of FIG. 6) the y' elements to unsigned 8-bit (byte) binary ranges. This yields x', which is the final decompressed data.

Hadamard Transform Matrix Arithmetic Unit

Returning the discussion to logic 112 of FIGS. 6 & 7, and the Hadamard Matrix adders, note the 10-bit widths of three of the four 1st-stage adders with outputs named sum01'/sum01' (0:9), sum23(0:9), & dif01(0:9), and the 9-bit adder named dif23(0:8). Adders of at least these particular widths are desired based on four considerations:

1. Desirability of using the same Hadamard Matrix adders for both forward and inverse transforms, which forces the single dataflow to satisfy the numerical ranges of both sets of operations.
2. The input elements for the forward transform, x, are an 8-bit number.
3. The input elements for the inverse transform, z', are signed binary numbers.
4. Custom adder circuit macros can be used for superior speed and chip area efficiency. Thus, internal carry-outs may not be available for overflow detection & sign correction, nor is it believed desirable to increase computation delay with additional logic stages to do so.

Specifically, when adder inputs are signed numbers, the most significant carry-out of the adder is not a valid part of the result. Hence, due to (1) & (4) above, the width of each adder must satisfy the ranges of the results for both operations without use of the carry-out. Then, due to (2), when the $1^{st}$-stage result is representable by k unsigned bits (such as sum01 & sum23), and by (3), when this same adder's result can be negative, a final design bit width of at least k+1 is required for the adder, from inputs to output. For example, sum01' range is (0:+510) which is representable as a 9-bit unsigned number, while sum01' is a signed sum of range (−64:+314) (which requires 10 bits by itself), hence the top left adder in FIG. 2 on page 12 must be a 10-bit-wide adder. The same design principles apply for the remaining 7 adders.

All 2nd-stage adders are 10 bits wide, due to the above reasoning.

UV Data Handling for Hadamard De/Compression Memory Accesses

This Hadamard Memory Reduction unit can be a new feature to an existing MPEG Decoder chip, which may use an available IC "core" for the MPEG decompression duties. This core of logic circuits can be used as-is, i.e., unchanged from previous chip designs. All local storage and internal exchange of video data within this core typically use fixed formats for Y (luminance) and UV (chrominance) data. These fixed formats have to be maintained for new designs, as in this case, due to the fixed core. Each digitized video sample is represented by 8 bits, regardless of whether it is a Y, U, or V sample. The Y data format is simple: completely Y data bytes contiguous in increasing memory locations, or for entire data transfers. The UV format is similar: each chrominance byte of data is a complete sample, being either U or V, and alternating U and V bytes are packed contiguously in increasing memory byte locations or for entire access data transfers.

For Hadamard compression during DRAM writes, the input data is presumably of some digitized baseband type, like video luminance-only or chrominance-only, on which a spatial frequency domain transformation is applicable. MPEG-decoded Frame Buffers, and parts thereof, are of this format, each being a single frame of contiguous pixel data, with the Y data separated into one section of the buffer, and the UV in the other section. As noted, pursuant to this invention the normal alternating-byte UV (CrCb) chrominance format is unacceptable, and must be manipulated to a format of separate all-U and all-V data prior to compression. After Hadamard decompression, it must therefore be re-assembled into the alternating-byte UV format.

The IBM MPEG Decoder External Memory Controller (MemC) is part of the Decoder core, and thus being unchanged, forces certain design constraints on the Hadamard Memory Reduction (HMR) unit (i.e., the compression/decompression engine 56 of FIGS. 4, 5 & 6): namely, the interfaces and protocol between the MemC and the other intra-core units must remain unchanged. An intra-core unit is a distinct functional unit that performs one or more of the MPEG decompression duties, examples being the Motion Compensation Unit, the Display Unit, and the Audio Buffer Unit. The HMR (or compression) unit has to replicate most of those connections, and data transfer & control signal timings, between itself and the intra-core units on one side, and the MemC on the other. These include:

Access arbitration: Memory access Request (unit-to-MemC) and Acknowledge (MemC-to-unit) signals (1 set per unit). These connections are not intercepted and replicated by the compression unit.

Memory access Request address bus (from respective unit), termed Req_Address. There is a distinct Req_Address bus associated with each Request/Acknowledge signal pair. A Req_Address value specifies the start address of an associated access, with MemC internally incrementing that value for access lengths of multiple 4-Byte (4 B) transfers. Each unit's $Req_{13}$ Address is an offset referenced to an-associated Base Address stored in MemC. These Base Addresses are initialized and managed by microcode, with host CPU program visibility. The address buses also are not replicated by the compression unit.

Memory access Lengths are fixed and implicitly specified via each unit's request.

Data bus connections: all data buses between the MemC and intra-core units are 32 bits wide. The Controller can perform "burst" data exchanges of one 4-byte data transfer per clock cycle for single or multiple transfers per access with the same unit. A distinct Data Valid (DVAL) control signal is defined for each Data bus, the activation of which conveys: (a) that MemC accepts and will latch the data at the end of the current cycle for write (WR) accesses to External DRAM (53 in FIG. 5), and thus, the source unit should switch to the next data in the transfer sequence for the following cycle; or (b) that MemC is driving valid data that cycle (for RD (read) accesses) which the intra-core unit should latch since it will be changed the following cycle.

Minimum resolution for addresses and access sizes is 2 bytes (1 Word).

1 byte=8 bits; 1 Word=2 bytes=16 bits; 1 DoubleWord=1 DWord=4 bytes=32 bits.

FIG. 5 shows certain of the above connections.

External Memory Addressing

Figure 8A:
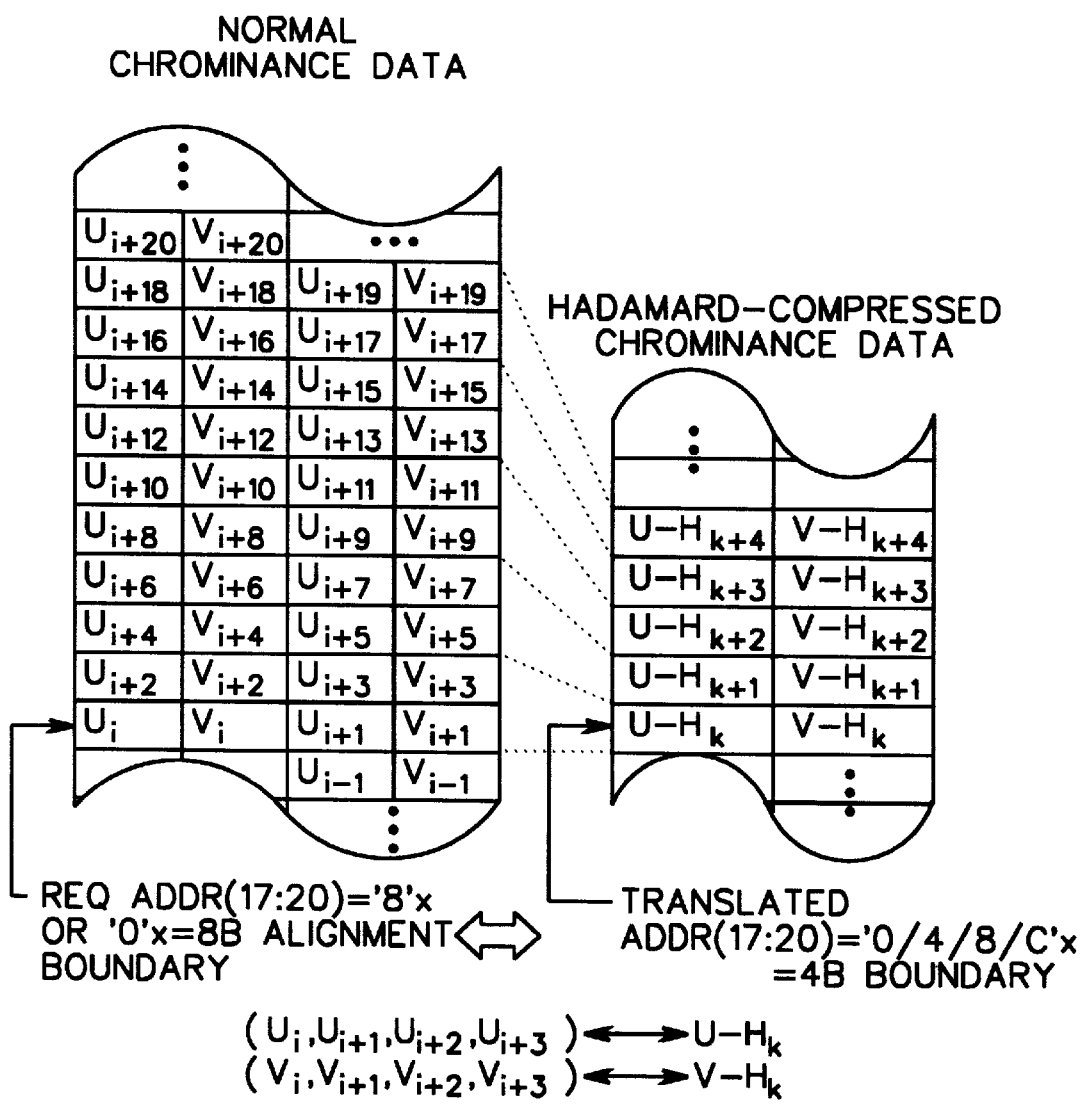
FIGS. 8a & 8b are representations of normal chrominance data and normal luminance data in memory and Hadamard-compressed chrominance data and Hadamard-compressed luminance data in memory in accordance with the principles of the present invention.
Figure 8B:
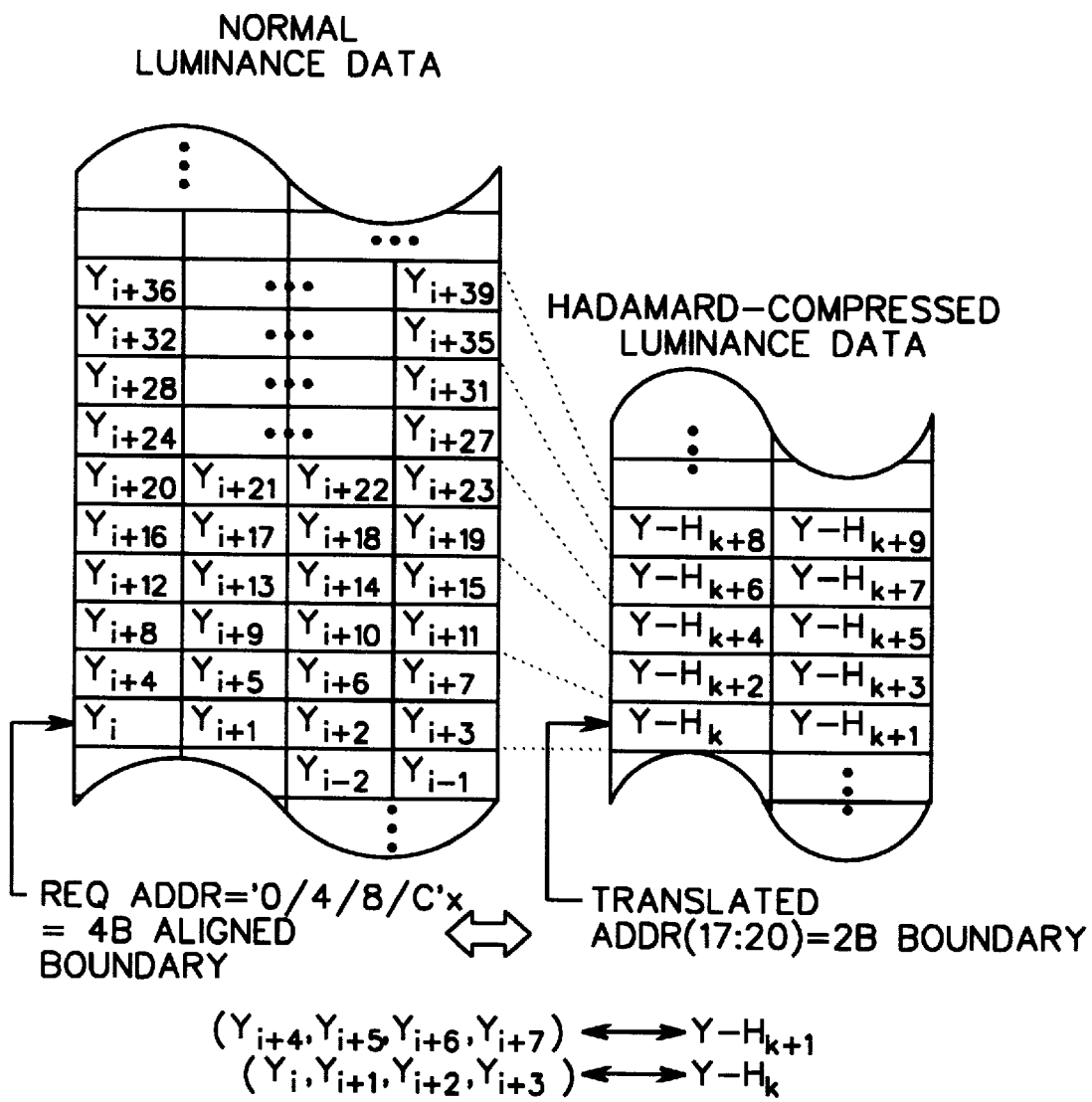

Refer to FIGS. 8a & 8b, which depict a general memory model, notably byte locations, DWord locations, and corresponding addresses. To address a normal (non-Hadamard-compressed) External DRAM size of 2 MB requires an address of 21 bits ('000000'x to '1FFFFF'x), while only 20 bits are needed to address the 1 MB Hadamard-compressed DRAM. Note that words are specified by byte addresses for which the lsb is '0'b (i.e., a Req_Addr(20)='0'b, where the full 21-bit address is denoted by Req_Addr(0:20)). Likewise, Dwords are located by addresses where both lsb's are 0 (i.e., a Req_Addr(19:20)='00'b). Due to the word resolution constraint listed above, External Memory addresses throughout the Decoder have the lsb (providing byte resolution) dropped, resulting in 20-bit word-addresses, or Req_Addr(0:19). To word-address 1 MB of DRAM, the MemC's physical addr to DRAM modules for word resolution is 19 bits, or Phys_Addr(1:19). The 2 MB address space is retained at the interfaces between the compression unit and the intra-core units for compatibility and programmable flexibility.

DRAM Access That Use Hadamard De/Compression

There are three basic External DRAM accesses that accommodate MPEG decoded video data:

WR accesses by the Motion Compensation Unit (MCU WR's) to all Frame Buffers. The length of this access type is fixed and is 16 bytes (i.e., 1 pixel row of a Macro Block), and the Request Address for this access is defined to be only on 16-byte alignment boundaries (Req_Address(17:19)='000'b).

RD accesses by the Motion Compensation Unit (MCU RD's) of only Reference Frame data (I and P frame buffers, also termed Frame Buffer 0 and Frame Buffer 1). The fixed length of this access type is 20 bytes (i.e., 1 Macro Block pixel row plus additional interpolation pixels), and it is defined to have Request Addresses of 2-byte alignment.

RD accesses by the Display Unit (Display RD's) of data from all Frame Buffers. Two access lengths are defined, 32-byte or 64-byte, and Request Addresses are allowed to be on 2-byte boundaries.

Description of the MCU WR, UV Data Access

In response to an MCU WR Request, the MemC (i.e., memory controller) grants the MCU (motion compensation unit) access to External Memory (i.e., DRAM) via an MCU_WR_Ack signal. The compression unit (which also receives this Acknowledge signal), immediately begins activating MCU_WR_DVAL to the MCU, signaling acceptance of the data driven on MCU_WR_Data bus. The MCU sends successive DWords on MCU_WR_Data of $U_iV_iU_{i+1}V_{i+1}$, $U_{i+2}V_{i+2}U_{i+3}V_{i+3}$, ect., one DWord per MCU_WR_DVAL cycle. For each of these cycles, the compression unit reroutes alternate bytes, concatenates like chrominance types together, and stores them in small, temporary buffering means, making use of high-speed multiplexer and control circuits.

Thus $U_i$ and $U_{i+1}$ are separated from the first DWord and combined as $U_iU_{i+1}$, and latched in Hadamard Input Register (0:15), while $V_iV_{i+1}$ are likewise combined and latched in Hadamard Input Register (16:31). Then, during the transfer cycle of the second Dword of MCU_WR_Data, $U_{i+2}U_{i+3}$ are combined and latched contiguously to the previously stored U data to form $U_iU_{i+1}U_{i+2}U_{i+3}$ in Hadamard Input Register (0:31), while $V_iV_{i+1}$ are transferred to Hadamard Input Reg. (32:47) and $V_{i+2}V_{i+3}$ are routed and latched to form $V_iV_{i+1}V_{i+2}V_{i+3}$ in Hadamard Input Register (32:63). At this point, these U-only and V-only Dwords are ready for Hadamard-based compression. The first U-only Dword from the input register (0:32) is Hadamard-compressed, and the 16-bit (Word) result is latched in the Hadamard Output Register (0:15). One cycle later, the first V-only Dword from Hadamard Input Register (32:63) is compressed, and that result is latched in Hadamard Output Register (16:31).

This process continues for the full 16 B of a MCU WR access, where the 3rd & 4th MCU_WR_Data DWords of $U_{i+4}V_{i+4}U_{i+5}V_{i+5}$ and $U_{i+6}V_{i+6}U_{i+7}V_{i+7}$ are rerouted and latched to form $U_{i+4}U_{i+5}U_{i+6}U_{i+7}$ and $V_{i+4}V_{i+5}V_{i+6}V_{i+7}$ in Hadamard Input Register (0:31) and Hadamard Input Register (32:63), respectively. The U-only DWord is Hadamard-compressed, the result of which is latched in Hadamard Output Register (32:47). Next, the V-only Dword is (Hadamard-compressed, the result of which is latched in Hadamard Output Register (48:63).

Finally, two cycles of HMR/Mem_WR—DVAL activity cause the transfer of this 8 bytes of Hadamard compressed MCU WR data to MemC, which subsequently stores it in DRAM. During the 1st DVAL cycle, Hadamard Output Register (0:31), which contains the U-$H_k$V-$H_k$ DWord, is multiplexed onto the HMR/Mem_WR_Data (0:31) bus. During the 2nd DVAL cycle, Hadamard Output Register (32:63) (i.e., the U-$H_{k+1}$V-$H_{k+1}$ DWord) is multiplexed onto the HMR/Mem_WR_Data (0:31) bus.

The above operations are actually performed in a pipelined fashion. Consider a simple example, where the compression unit and MemC units are idle initially, the following overlapped operations are defined:

Cycle −1: MCU_WR_Req=1 driven from MCU to MEMC.

Cycle 0: MCU_WR_Ack=1 driven from MemC to MCU.

Cycle 1: MCU must drive valid data on MCU_WR_Data (0:31), MCU_WR_Req may remain '1' if it has 16 B (or more) of data to WR; MCU_WR_Ack=0; the compression unit activates MCU_WR_DVal, and latches 1st UV-DWord in Hadamard Input Register (0:31).

Cycle 2: Compression unit activates MCU_WR_DVal, latches 2nd UV-DWord in Hadamard Input Register, forming U-only & V-only DWords in Hadamard Input Register (0:63).

Cycle 3: Compression unit does Hadamard compression on 1st U-DWord from Hadamard Input Register (0:31), latches this Word result in Hadamard Output Register (0:15), activates MCU_WR_DVal, and latches 3rd UV-DWord in Hadamard Input Register (0:31).

Cycle 4: Compression unit does Hadamard compression on 1st V-DWord from Hadamard Input Register (32:63), latches that Word result in Hadamard Output Register (16:31), activates MCU_WR—DVal, and latches 4th UV-DWord forming U-only & V-only DWords in Hadamard Input Register (0:63).

Cycle 5: MemC drives Mem/MCU_WR—DVAL=1 to the compression unit. Compression unit routes Hadamard Output Register (0:31) (U-Had & V-Had compressed Words) to HMR/Mem—WR_Data, does Hadamard compression on 2nd U-DWord from Hadamard Input Register (0:31), and latches this result in Hadamard Output Register (32:47).

Cycle 6: MemC drives Mem/HMR_WR_DVAL=0 to the compression unit. Compression unit still routes Hadamard Output Register (0:31) to HMR/Mem_WR_Data, does Hadamard compression on 2nd V-DWord from Hadamard Input Register (32:63), and latches this result in Hadamard Output Register (48:63).

Cycle 7: MemC drives Mem/HMR_WR—DVAL=1to the compression unit. The compression unit routes Hadamard Output Register (32:63) to HMR/Mem_WR_Data, & Ends its sequencer. End of Access (DVAL=0 next cycle).

The above cycle numbering scheme matches the state assignment numbering of the Hadamard WR access sequential logic (disregarding Cycle −1). It is evident that the 16 bytes of original data for the MCU WR access is transformed to 8 Bytes of Hadamard compressed data for the final WR transfers to MemC (and DRAM).

Sequential logic functions generate the MUX and latch control signals for the Hadamard Input Register and the Hadamard Output Register buffers. Namely, the H_WRUV (1:7) states completely control an entire UV MCU WR access. States H_WRUV (1:4) can overlap with H_WRUV/Y (5:7) of a previous MCU WR access, providing the capability of concurrency of multiple accesses.

For ease and speed of generating Hadamard decompressed UV data, the Hadamard compressed words are stored in an alternating UV format, again as shown in the memory addressing diagram of FIGS. 8a & 8b.

Description of the MCU RD and Display RD UV Data Accesses

For these accesses, the overall data path is from External DRAM (source) through MemC, through the compression unit, and finally to the requesting unit, i.e., the display unit or MCU.

The control that starts reading of Hadamard-compressed data (H-RDs) is not Ack, since MemC Data-Transfer-Section sources data to the compression unit, the process must be synchronized with it ==>CmdVal.

Compressed Hadamard read data from DRAM is transferred from MemC to the compression unit via MEM_RD_Data (0:31), and is latched in Hadamard Input Register (32:63).

H_RD Hadamard decompression and routing operations: First Hadamard Input Register (48:63), which always is a V-only Word of Hadamard-compressed data due to Hadamard RD address handling, for example, in MemC and the associated DRAM fetch, sources the data for the 1st Hadamard decompression operation, and the result (a V-only DWord) is latched in Hadamard Output Register (32:63). Next cycle, Hadamard Input Register (48:63) containing U-only compressed data is Hadamard-decompressed and generates a U-only 32-bit result, which is latched in Hadamard Output Register (0:31). Next cycle, the compression unit activates unit_RD—DVAL (i.e., display unit or MCU), assembles a 32-bit quantity from the following Hadamard Output Register bits:

(0:7)∥(32:39)∥(8:15)∥(40:47) or, equivalently, B0∥B4∥B1∥B5=B0415, and multiplexes this DWord to Mem_RD_Data (0:31). The assembly operation restored the decompressed video data to alternating-byte UV format, where the operation "∥" denotes concatenation, and B0=(0:7), B1=(8:15), . . . , B7=(56:63) of an 8-byte quantity. Also during that cycle, the content of Hadamard Output Register (16:23) (48:55) (24:31) (56:63) (i.e., Hadamard Output Register B2637) is transferred to and latched in Hadamard Output Register (0:31). The last cycle in the basic H-RD sequence multiplexes the already alternating-byte UV data in Hadamard Output Register (0:31) to Mem_RD_Data (0:31). Recursion of these operations occurs until the correct length of data has been transferred to the RD-requesting unit (MCU or Display) for the particular access.

Pipelined:
Cycle 0: Mem/HMR_CmdVal=1, & RnW=1, & YnUV=0, & Unit (0:1)=(MCU or Display)

Cycle 1: Mem/HM_RD_DVAL=1 along w/ Mem/HMR_RD_Data driven from MemC to HMR. 1st Hadamard-compressed U-H/V-H DWord latched in Hadamard Input Register (32:63).

Cycle 2: 1st V Hadamard decompression; 4 B V result is latched in Hadamard Output Register—B4567; Mem/HMR_RD_DVAL=0.

Cycle 3: 1st U Hadamard decompression; 4 B U result is latched in Hadamard Output Register—B0123; Mem/HMR_RD_DVAL=0; Latch 2nd Hadamard-compressed U-Word/V-Word in Hadamard Input Register.

Cycle 4: Hadamard Output Register—B0415 is muxed onto Mem_RD_Data (0:31), while Hadamard Output Register—B2637 is transferred to Hadamard Output Register (0:31) (i.e., B 0123); 2nd V Hadamard decompression; 4 B V result is latched in Hadamard Output Register—B4567.

Cycle 5: Hadamard Output Register—B0123 (now alternating byte UV format) is muxed onto Mem_RD_Data, while 2nd U Hadamard decompression; 4B U result is latched in Hadamard Output Register—B0123.

2 B resolution handling: Table 1 describes shift and multiplexing operations which:

1. reassemble the U-V alternating byte data format from the U- & V-only Hadamard decompression result DWords; and
2. align the appropriate Words of UV data to supply 2-byte addressed DRAM data in contiguous, 4 B transfers to the Display & MC units for Hadamard RD accesses.

TABLE 1

Had-RD Decompressed Chroma Data Routing to Handle 2-Byte Address Resolution

| Request | Source Reg of Had-decompressed RD data to Display or MCU | |
|---|---|---|
| Addr(19:20) | 1st,3rd,5th, . . . Dword | 2nd,4th,6th, . . . Dword |
| 00 | HOUTL2-B0415 | HOUTL2(0:31) (HOUTL2-B2637 loaded into (0:31) during previous cycle) |
| 01 | HOUTL2(0:31) (HOUTL2 (0:31) <-B2637 prev cyc) | HOUTSaveL2 (0:15)‖ HOUTL2-B04 (HOUTSavL2 <-B37 prev cyc) |
| 10 | HOUTL2(0:31) (HOUTL2 (0:31) <-B2637 prev cyc) | HOUTL2-B0415 |
| 01 | HOUTSaveL2(0:15) ‖ HOUTL2-B04 (HOUTSaveL2 <-B37 prev cyc) | HOUTL2(0:31) (HOUTL2(0:31) <-B2637 prev cyc) |

Note: The operator "‖" denotes concatenation.
Note: HOUTL2 is a 64-bit register which is part of the Hadamard Output Register
Note: HOUTSaveL2 is a 16-bit register which is part of the Hadamard Output Register.
Note: HOUTSaveL2's contents, when used, already have alternating U-V format.

Buffering of input data for Hadamard WR accesses (from the Motion Compensation Unit) of 8 Bytes can be provided, as well as Hadamard WR access output buffering of 8B. For Hadamard RD accesses, input buffers (data from DRAM) are 4B, and output buffers are 10 Bytes. The same registers can be used for Hadamard WR & RD buffers in a time-domain-multiplexed fashion.

Address and Length Translations for Hadamard Memory Reduction

The mapping of the normal (non-Hadamard-compressed) address space to the Hadamard-compressed address space is shown in FIGS. 8a & 8b.

As described in the UV Parsing section above, all Hadamard-compressed DRAM accesses possess the following characteristic:

Normal data sizes on the intra-core unit side correspond to data of half that size on the compressed side, including that stored in DRAM.

The Hadamard compression operations for MCU WR's are only on 8-byte-aligned 8B quantities, generating 4B results that are DWord (i.e., 4-byte) aligned. The Hadamard decompression operations for Display/MCU RDs, even for 2B-aligned Request Addresses, must be done on these compressed DWords to be mathematically valid, hence all DRAM data fetches for Hadamard RDs must be on 4B boundaries. For 2-byte address resolution, first the DWord-aligned decompression is performed, then shift operations in the compression unit align the final data such that the Word of the requested address is in the most significant position of Mem_RD-Data (i.e., bits (0:15)). For all subsequent transfers of a multi-transfer access, identical shift operations are performed on the subsequent decompressed data items.

Thus, in general, for compression unit DRAM accesses, the Request Addresses (always in the Normal form & being of Word-resolution) first must have their 2 lsb's zeroed, where these 2 bits are saved for use by the compression unit for RD data alignment once data is fetched from DRAM (for RD accesses only). Then this modified address is divided by two (2) to create a "HadMr Logical Address". The Modulo and Base Address Register operations are performed on this logical address resulting in the Physical Address used to actually access the DRAM modules. Also, when the Request Address is not DWord-aligned, the Length of the physical DRAM access by MemC's data transfer section is adjusted to the next larger 4B multiple.

The following table summarizes the exact address and length transformations which must be performed for Hadamard accesses.

TABLE 2

Address Conversions for Hadamard-Compressed DRAM Data

| Unit | RD/WR | Request Addr (17:18) | Request Len (0:5) | H-Compressed Addr (0:18) | H-Compressed Len (0:5) |
|---|---|---|---|---|---|
| MC | WR | '00'b | '08'x (16Byt) | '0'b‖Req_Addr(0:16)‖'0'b | '04'x |
| MC | RD | '00'b '01'b '10'b '11'b | '0A'x (20B) | '0'b‖Req_Addr(0:16)‖'0'b | '06'X '06'X '06'X '08'X |
| Disp | RD | '00'b '01'b '10'b '11'b | '10'x (32B) | '0'b‖Req_Addr(0:16)‖'0'b | '08'x '0A'x '0A'x '0A'x |
| Disp | RD | '00'b '01'b '10'b '11'b | '20'x (32B) | '0'b‖Req_Addr(0:16)‖'0'b | '10'x '12'x '12'x '12'x |

Note: (1) Request Addr is the normal (pre-Hadamard) logical offset address, with 2-byte (Word) resolution, and is the start address of the given number of words for each access. It's a logical offset in that it is prior to Base-relative, Spill Buffer management, and Modulus calculations performed by the DRAM Control Unit. Bits (17:18) are the Word offset within a given 8-byte line specified by ReqAddr(0:16).
(2) Request Len is the number of words that constitutes a given access (normal/non-Hadamard equivalent).
(3) Hadamard-Compressed Addr is still a logical offset start address (prior to Base, Spill Buffer, & Modulus calculations), and of Word resolution, but which specifies the offset start location of the 4B chunks of Hadamard compressed data actually present which correspond to the pre-Hadamard (WRs), or Had$^{-1}$ (RDs), data of the Request Addr.

Those skilled in the art will note from the above discussion that this invention comprises a practical technique for reducing memory requirements of a conventional MPEG decode system by storing decoded video data sequences in compressed form. Pursuant to an implementation of this invention, hardware is provided for 2:1 compressing a decoded reference frame prior to storage in a frame buffer. Thus, with this technique, 1-MB DRAM can be employed in place of the 2-MB DRAM memory common in many decode systems. By so reducing memory requirements, significant cost savings are achieved. When a compressed frame is required for motion compensation or display, decompression of the data is peformed, returning the data to its original decoded format using the same hardware as employed to compress the data.

Further, the compression/decompression engine described herein provides an efficient hardware design implementing N-point Hadamard matrix and subsequent lossy compression/decompression operations. Special parsing of video chrominance (UV) data is performed prior to compression, as well as reassembly of the compressed data to its original format after decompression. Data address and length translations are defined for hardware accesses to occur for storage/retrieval of Hadamard-compressed frame buffer data. Further, provisions for handling general data accesses to memory for which Hadamard de/compression is not performed, as well as the integration of non-Hadamard and Hadamard accesses, dynamically switched, into a single system have been disclosed.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A compression unit for a system for decoding a digital video sequence, said system having a video decoder, memory and a memory controller, said compression unit to be coupled between said video decoder and said memory controller for compressing decoded video data output from the video decoder for storage in said memory by the memory controller, said compression unit comprising:

Hadamard transform logic for transforming the decoded video data output from the video decoder to a frequency domain signal using a Hadamard transformation;

compression logic coupled to the transform logic for compressing the frequency domain signal to produce a compressed video signal; and wherein said Hadamard transform logic and said compression logic transform and compress multiple bytes of decoded video data in a single stage executed in a single clock cycle of said system to produce said compressed video signal.

2. The compression unit of claim 1, wherein said Hadamard transform logic implements a 4-point Hadamard transform and comprises multiple adders coupled in parallel such that four bytes of decoded video data are transformed by said transform logic in a single stage executed in a single clock cycle of said system.

3. The compression unit of claim 2, wherein an output vector y ($y_1, y_2, y_3, y_4$) of the 4-point Hadamard transform implemented by the transform logic is defined as:

$$y_0 = \frac{1}{4} \cdot (x0+x1+x2+x3)$$
$$y_1 = \frac{1}{4} \cdot (x0+x1-x2-x3)$$
$$y_2 = \frac{1}{4} \cdot (x0-x1-x2+x3)$$
$$y_3 = \frac{1}{4} \cdot (x0-x1+x2-x3)$$

and wherein the ¼ term of each of said $y_0$, $y_1$, $y_2$ & $y_3$ equations is implemented within said compression logic.

4. The compression unit of claim 3, wherein said compression logic comprises means for dividing, means for rounding and means for truncating said frequency domain signal to produce said compressed video signal.

5. The compression unit of claim 4, wherein said means for dividing, means for rounding and means for truncating comprise means for performing 2:1 compression on said frequency domain signal.

6. The compression unit of claim 1, wherein said digital video sequence includes luminance data and chrominance UV data, said chrominance UV data comprising an alternating UV sample format when output from said video decoder, and wherein said compression unit comprises means for parsing said alternating UV sample format of said chrominance U data and chrominance V data into separate data strings for handling by said transform logic and said compression logic, said Hadamard transform logic transforming the separate data strings of said chrominance U data and said chrominance V data into frequency domain signals and said compression logic producing compressed video signals from said frequency domain signals.

7. The compression unit of claim 6, wherein said Hadamard transform logic comprises a multi-point Hadamard transform and said means for parsing said chrominance U data and said chrominance V data comprises means for forming multi-byte chrominance U data strings and multi-byte chrominance V data strings.

8. The compression unit of claim 1, wherein said compression unit further comprises a decompression unit for decompressing said compressed video signal, said decompression unit comprising:

unpack and multiply logic for expanding said compressed video signal;

said Hadamard transform logic further comprising means for inverse transforming said expanded compressed video signal from frequency domain to spatial domain; and truncate means for decompressing the spatial domain output of said Hadamard transform logic to reconstruct said decoded video data in original format.

9. A compression unit for a system for decoding a digital video sequence, said system having a video decoder, memory and a memory controller, said compression unit to be coupled between said video decoder and said memory controller for compressing decoded video data output from the video decoder for storage in said memory by the memory controller, said digital video sequence comprising chrominance UV data and luminance data, said chrominance UV data comprising an alternating UV sample format when output from said video decoder, said compression unit comprising:

means for parsing said alternating UV sample format of said chrominance UV data to separate said chrominance UV data into chrominance U data and chrominance V data strings;

Hadamard transform logic for transforming the separate chrominance U data and chrominance V data strings into frequency domain signals using a Hadamard transformation; and compression logic coupled to the Hadamard transform logic for compressing the frequency domain signals to produce compressed video signals representative of said separate chrominance U data and chrominance V data strings.

10. The compression unit of claim 9, further comprising address and length translation means for tracking said compressed video signals representative of chrominance U data and chrominance V data when stored to memory.

11. The compression unit of claim 9, wherein said compressed video signals produced by said Hadamard transform logic and said compression logic are each formed from multiple bytes of chrominance U data, chrominance V data, or luminance data comprising decoded video data from the video decoder.

12. The compression unit of claim 9, wherein said Hadamard transform logic comprises a Hadamard transformation of multiple data bytes in parallel in a single stage executed in a single clock cycle, said data bytes comprising bytes of luminance data, or chrominance U data or chrominance V data.

13. The compression unit of claim 12, wherein said Hadamard transform logic implements a 4-point Hadamard transform and comprises multiple adders coupled in parallel so that four bytes of luminance data, chrominance U data or chrominance V data of said decoded video data are transformed in parallel within a single clock cycle of said system.

14. The compression unit of claim 13, wherein said compression logic comprises means for dividing, means for rounding and means for truncating said frequency domain signals to produce said compressed video signals.

15. The compression unit of claim 14, wherein said means for dividing, means for rounding and means for truncating comprise means for performing 2:1 compression of said frequency domain signals to produce said compressed video signals.

16. The compression unit of claim 9, wherein said compression unit further comprises a decompression unit for decompressing said compressed video signals stored in said memory, said decompression unit comprising:

unpack and multiply logic for expanding said compressed video signals;

said Hadamard transform logic further comprising means for inverse transforming the expanded compressed video signals from frequency domain to spatial domain; and truncate means for decompressing the spatial domain output of said Hadamard transform logic to reconstruct said chrominance U data and chrominance V data.

17. The compression unit of claim 16, further comprising reassembly logic for reassembling said chrominance UV data from said reconstructed chrominance U data and chrominance V data.

18. A system for decoding a digital video sequence, said system comprising:

a video decoder for decoding the digital video sequence to produce decoded video data;

memory and a memory controller coupled to the video decoder;

a compression engine coupled between the video decoder and the memory controller for compressing decoded video data output from the video decoder for storage in said memory by said memory controller, said compression engine comprising:

Hadamard transform logic for transforming the decoded video data output from the video decoder to a frequency domain signal using a Hadamard transformation;

compression logic coupled to the Hadamard transform logic for compressing the frequency domain signal to produce a compressed video signal; and wherein said Hadamard transform logic and said compression logic transform and compress multiple bytes of decoded video data in parallel in a single stage executed in a single clock cycle of said system to produce the compressed video signal for storage in said memory by said memory controller.

19. The system of claim 18, wherein said compression logic comprises means for dividing, means for rounding and means for truncating said frequency domain signal to produce said compressed video signal.

20. The system of claim 19, wherein said compression logic comprises logic for performing 2:1 lossy compression on said frequency domain signal.

21. The system of claim 18, wherein said compression engine further comprises a decompression engine for decompressing said compressed video signal, said decompression engine comprising:

unpack and multiply logic for expanding said compressed video signal;

said Hadamard transform logic further comprising means for inverse transforming said expanded compressed video signal from frequency domain to spatial domain; and truncate means for decompressing the spatial domain output of said transform logic to reconstruct said decoded video data in original format.

22. A system for decoding a digital video sequence, said digital video sequence comprising chrominance UV data and luminance data, said chrominance UV data comprising an alternating UV sample format, said system comprising:

a video decoder for decoding the digital video sequence and producing decoded video data;

memory and a memory controller coupled to the video decoder;

a compression engine coupled between the video decoder and the memory controller for compressing decoded video data output from the video decoder for storage in said memory by said memory controller, said compression engine comprising:

means for parsing said alternating UV sample format of said chrominance UV data to separate said chrominance UV data into chrominance U data and chrominance V data;

Hadamard transform logic for transforming the separate chrominance U data and chrominance V data into frequency domain signals using a Hadamard transformation; and compression logic coupled to the Hadamard transform logic for compressing the frequency domain signals to produce compressed video signals representative of said separate chrominance U data and chrominance V data.

23. The system of claim 22, wherein said compression engine further comprises address and length translation means for tracking said compressed video signals representative of chrominance U data and chrominance V data when stored to memory.

24. The system of claim 22, wherein said Hadamard transform logic comprises a Hadamard transformation of multiple data bytes in parallel in a single stage executed in a single clock cycle, said data bytes comprising bytes of luminance data, or chrominance U data or chrominance V data.

25. The system of claim 24, further comprising a decompression engine for decompressing said compressed video signals, said decompression engine comprising:

unpack and multiply logic for expanding said compressed video signals;

said Hadamard transform logic further comprising means for inverse transforming the expanded compressed video signals from frequency domain to spatial domain; and truncate means for decompressing the spatial domain output of said Hadamard transform logic to reconstruct chrominance U data and chrominance V data.

26. The system of claim 25, further comprising reassembly logic for reassembling said chrominance UV data from said reconstructed chrominance U data and chrominance V data.

* * * * *

UNITED STATES PATENT AND TRADEMARK OFFICE
CERTIFICATE OF CORRECTION

PATENT NO.   : 6,157,740
DATED        : December 5, 2000
INVENTOR(S)  : Buerkle et al.

Page 1 of 1

It is certified that error appears in the above-identified patent and that said Letters Patent is hereby corrected as shown below:

Column 17,
Line 46, delete "Mem/MCU" and replace with -- Mem/HMR --.

Signed and Sealed this

Sixteenth Day of October, 2001

Attest:

*Attesting Officer*

NICHOLAS P. GODICI
*Acting Director of the United States Patent and Trademark Office*